United States Patent
Zhou et al.

(10) Patent No.: US 9,104,829 B2
(45) Date of Patent: Aug. 11, 2015

(54) METHOD OF VALIDATING TIMING ISSUES IN GATE-LEVEL SIMULATION

(71) Applicants: Jian Zhou, Suzhou (CN); Chao Liang, Suzhou (CN); Geng Zhong, Suzhou (CN)

(72) Inventors: Jian Zhou, Suzhou (CN); Chao Liang, Suzhou (CN); Geng Zhong, Suzhou (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/488,313

(22) Filed: Sep. 17, 2014

(65) Prior Publication Data

US 2015/0135153 A1    May 14, 2015

(30) Foreign Application Priority Data

Nov. 8, 2013  (CN) .......................... 2013 1 0549963

(51) Int. Cl.
 *G06F 9/455* (2006.01)
 *G06F 17/50* (2006.01)
(52) U.S. Cl.
 CPC ................. *G06F 17/5068* (2013.01)
(58) Field of Classification Search
 USPC .......................... 716/104, 105, 106, 108, 134
 See application file for complete search history.

(56) References Cited

U.S. PATENT DOCUMENTS

| | | | |
|---|---|---|---|
| 6,185,723 B1 | 2/2001 | Burks | |
| 6,425,115 B1* | 7/2002 | Risler et al. | .................... 716/114 |
| 6,760,894 B1 | 7/2004 | Yalcin | |
| 6,845,479 B2 | 1/2005 | Illman | |
| 7,373,626 B2 | 5/2008 | Ko | |
| 8,000,950 B2 | 8/2011 | Hira | |
| 8,191,033 B1* | 5/2012 | Bruch | ........................... 716/136 |
| 8,402,405 B1 | 3/2013 | Chang | |
| 2003/0188282 A1* | 10/2003 | Yang et al. | ....................... 716/10 |
| 2012/0072876 A1 | 3/2012 | Salz et al. | |
| 2012/0185810 A1 | 7/2012 | Borkam et al. | |
| 2014/0165022 A1* | 6/2014 | Stevens | ......................... 716/134 |

* cited by examiner

*Primary Examiner* — Brian Ngo
(74) *Attorney, Agent, or Firm* — Charles Bergere

(57) ABSTRACT

A method of validating timing issues in a gate-level simulation (GLS) of an integrated circuit design including multiple cells includes running a simulation routine of a behavioral model of the design and obtaining a first simulation result. If there is a possible timing violation at a cell corresponding to a forcing indeterminate value, the simulated output of the cell is forced to a first value and a second simulation result obtained. If this result is negative, a report of apparent timing violations at the cell is generated. If the second simulation result is positive, the output of the cell is then forced to a second value and a third simulation result is obtained. If this result is negative, a report of apparent timing violations at the cell is generated but, if it is positive, a report of no apparent timing violation is generated.

11 Claims, 4 Drawing Sheets

METHOD OF VALIDATING TIMING ISSUES IN GATE-LEVEL SIMULATION

BACKGROUND OF THE INVENTION

The present invention is directed to integrated circuit design and test and, more particularly, to a method of validating timing issues in a gate-level simulation of an integrated circuit design.

During the electronic design automation (EDA) design flow of an integrated circuit (IC) having digital (or mixed digital and analog) circuitry, register-transfer-level (RTL) abstraction typically is used in hardware description languages (HDLs) like Verilog and VHDL to create high-level representations of the IC, selecting standard cell designs and their characteristics from a standard cell library. An RTL description is defined in terms of registers that store signal values, and combinational logic that performs logical operations on signal values. The RTL description is usually converted to a gate-level description (such as a netlist) that is used by placement and routing tools to create a physical layout.

The correct operation and performance of the IC is often limited by timing considerations. Static timing analysis (STA) of an IC enables analysis of simplified delay models of the IC and identification of such issues as hold-time and set-up time violations, glitches, and clock skew, using definitions of critical paths and corners. However, STA constraints may be incorrect and may miss some critical paths so dynamic gate-level simulation of the design is often necessary.

Typically dynamic gate-level simulation determines the output values of a gate based on the input values of the gate. If one or more of the input values is indeterminate (that is to say ambiguous), the behavioral model of the simulator may result in an output value of the gate that is also indeterminate. As the simulation progresses, these indeterminate values are propagated from gate to gate to the outputs of a combinational block. The indeterminate values are designated X in some EDA languages. In particular, in VHDL the values 'U', 'X', 'W', and '-' are metalogical values; they define the behavior of the model itself rather than the behavior of the hardware being synthesized, where 'U' represents the value of an object before it is explicitly assigned a value during simulation; 'X' and 'W' represent forcing and weak values, respectively, for which the model is not able to distinguish between logic levels and are distinct from values from a high impedance source or output, designated Z, which may not propagate from gate to gate. The propagation of the indeterminate X values typically cause the simulation to crash, increasing the difficulty of analyzing the cause and position of a timing violation.

When a possible timing violation can be identified as a false timing violation, that is to say one that will not in fact occur in the physical IC, it is possible in some conventional timing simulation techniques to set a parameter called an Xfilter for the standard cell. In this technique, when the Xfilter parameter is set, the model of the identified cell generates an output value corresponding to the cell input value and the theoretical function of the cell. For example, in the case of a D flip flop with a positive edge clock, the model will generate a definite output value equal to the value at the D input at the positive edge of the clock if the Xfilter parameter is set. In addition, all the timing checks for that cell will be disabled, enabling the simulation to proceed without this cell being the cause of the simulation crashing. However, the behavior of the cell in the simulation with the Xfilter parameter set will be unlike the cell in the physical IC. Also the Xfilter disables all the timing checks for that cell, which may mask real timing violations at other points in time. Moreover, in the case of synchronous circuit blocks, it may be difficult to identify whether clock signals are in the same clock domain or not, and validate the possible timing violation, because there may be many buffers in the clock tree, clock gate cells and clock dividers of the same domain.

Identifying and analyzing timing violations and distinguishing real from false timing violations in the IC design can be very labor-intensive and time-consuming. A method of doing so efficiently and with a higher degree of automation is sought.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

DETAILED DESCRIPTION OF PREFERRED EMBODIMENTS OF THE INVENTION

Figure 1:
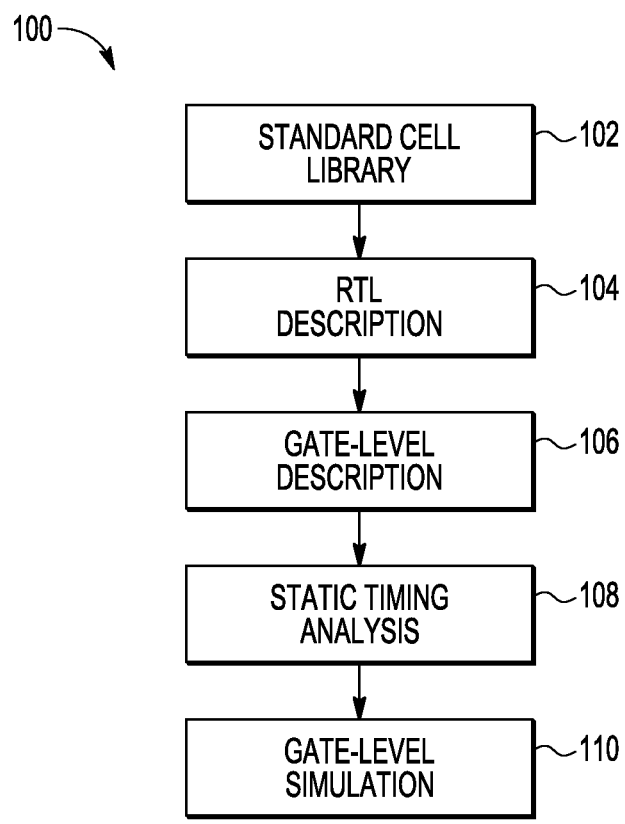
FIG. 1 is a simplified flow chart of a conventional method of producing a gate-level design of a processing device and analyzing timing issues therein.

Referring now to FIG. 1, a conventional method 100 of electronic design automation (EDA) for producing a gate-level design of an integrated circuit (IC) and analyzing timing issues in the IC is shown. The method 100 starts at step 102 selecting standard cells from a library to include in the IC and producing a register-transfer-level (RTL) description at step 104. The RTL description is converted to a gate-level description (such as a netlist) at step 106. At step 108, static timing analysis (STA) of the gate-level description is performed and any timing issues revealed by the STA may be resolved by changes to the design. Dynamic gate-level simulation of the design is then performed at step 110.

Figure 2:
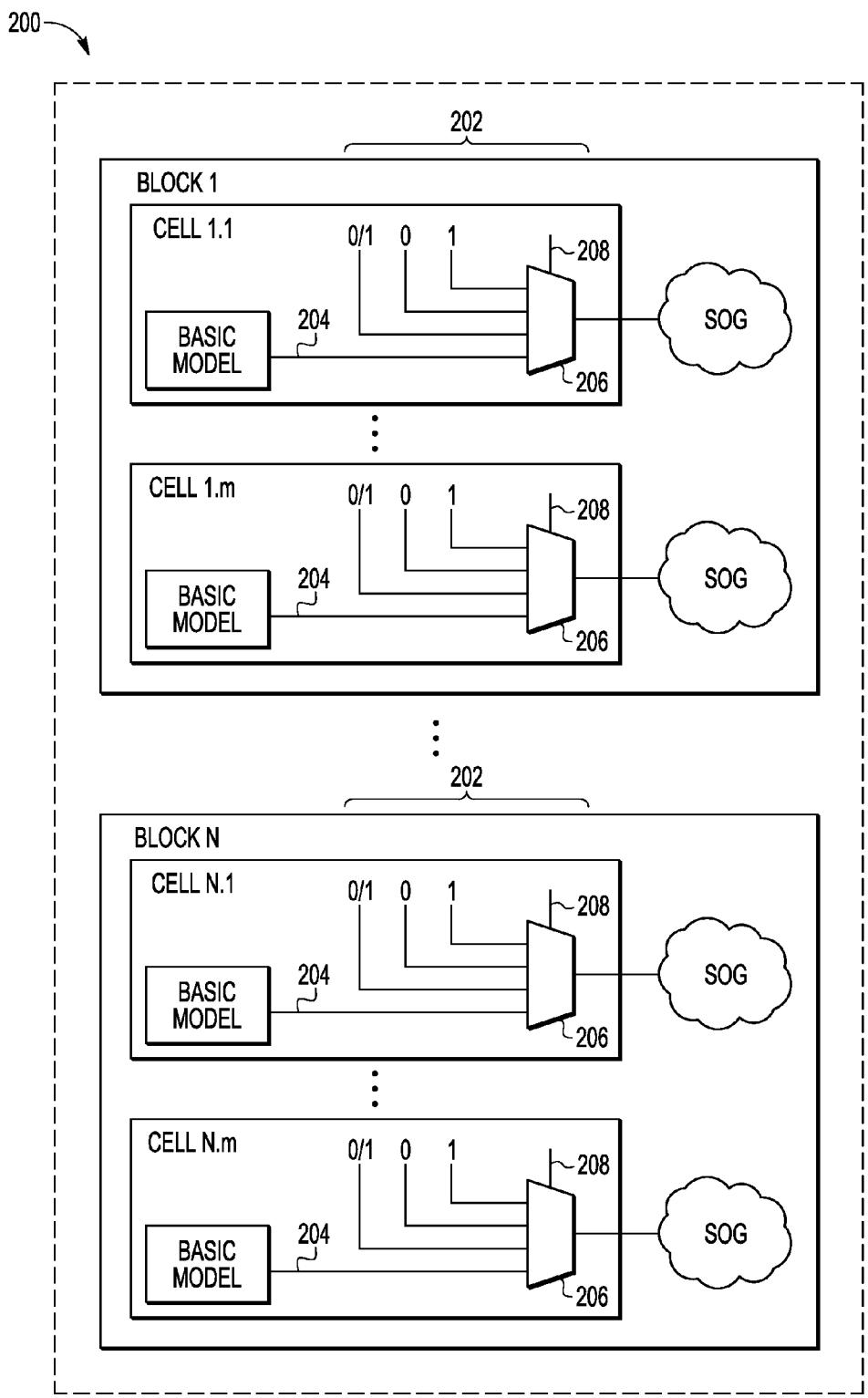
FIG. 2 is a schematic block diagram of a behavioral model of modules used in a gate-level design and simulation of an integrated circuit design in accordance with an embodiment of the present invention, given by way of example.
Figure 3:
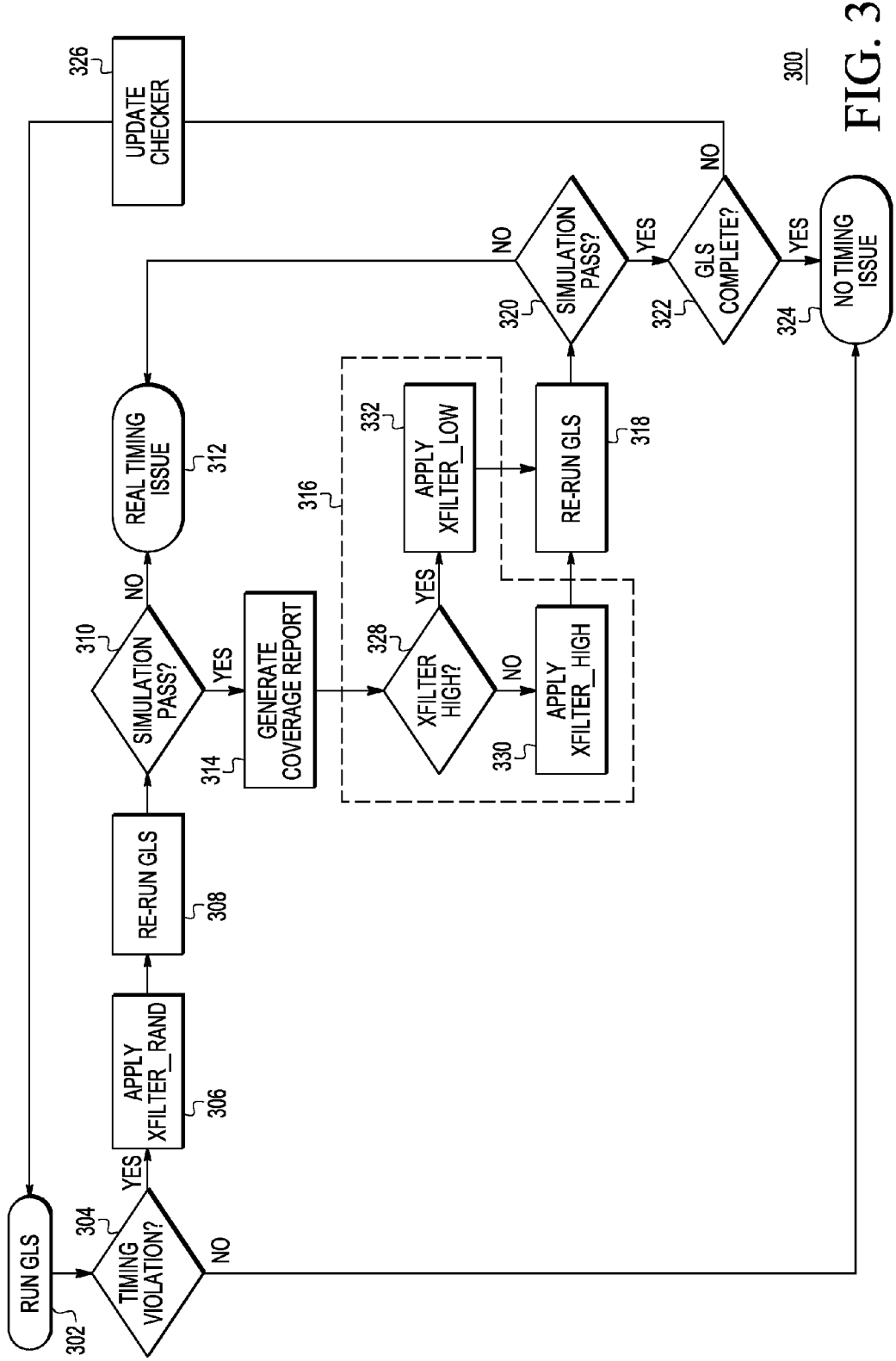
FIG. 3 is a flow chart of a method of simulating and analyzing timing issues in the integrated circuit design in accordance with an embodiment of the invention.

FIGS. 2 and 3 illustrate a method 300 in accordance with an embodiment of the present invention of validating timing issues in a gate-level simulation (GLS) of an integrated circuit (IC) design 200 having a plurality of cells. The method 300 comprises running a gate-level simulation (GLS) at step 302 of a behavioral model of the design 200 and obtaining a first simulation result 304. If the first simulation result 304 yields a possible timing violation at a cell corresponding to the forcing of an indeterminate value, the simulated output of the cell is forced at step 306 to a first value. The simulation routine is re-run at step 308 and a second simulation result 310 is obtained. If the second simulation result 310 is an apparent timing violation at the cell, a report 312 of the apparent timing violation at the cell is generated. If the second simulation result 310 has no apparent timing violation at the cell, a report of the first value and status of the simulated output of the cell is generated at step 314. The simulated output of the cell is then forced at step 316 to a second value.

The simulation routine is re-run at step 318 and a third simulation result 320 is obtained. If the third simulation result 320 yields an apparent timing violation at the cell, a report of the apparent timing violation is generated at step 312. If the third simulation result 320 has no apparent timing violation at the cell, the simulation is completed. A report of no apparent timing violation is generated at step 324 if no timing violation is found at step 304 or at step 320.

A gate-level design of the IC design 200 may be compiled using standard cells selected from a library (such as the standard cell library shown in FIG. 1 at 102). As illustrated in FIG. 2, in an example of a behavioral model of a gate-level design of the IC design 200, at least some of the behavioral models of standard cells include configurations 202 for forcing the cell simulated output to the first or second value. The configurations 202 for forcing the cell simulated output may substitute the first value or the second value of the simulated cell output for a value of the simulated cell output that would otherwise be obtained. The first value may be a random value, and the second value is different from the first value.

If the first simulation result yields a possible timing violation, the simulated outputs of the plurality of cells may be forced to respective first values, which may be randomly defined, the simulation routine can then be re-run and a second simulation result obtained. If the second simulation result is an apparent timing violation at one or more of the plurality of cells, a report of the presence or absence of apparent timing violations, the first values and statuses of the simulated outputs at the plurality of cells may be generated. At least for the cell or cells whose result was no apparent timing violation, the simulated outputs of the cell or cells are forced to second values, different from the respective first values, the simulation routine is re-run and a third simulation result is obtained. If no apparent timing violations appear with the second values either, the simulation may again be re-run, with iterations of the simulation routines and reports until the source of the timing violation of the first simulation result is identified.

Completing the simulation may include checking at step 322 whether a simulation process is complete and updating a checker for the simulation progress at step 326. If the simulation process is not complete (or is imperfect), further simulation routines 302 can then be run.

The cells of the IC design 200 are not necessarily combinational cells and at least some of the cells may be connected sequentially.

A report of the simulation result, of the simulated output value of the cell and of whether the simulated output value of the cell was forced may be generated for each of the simulation routines performed. Re-running the simulation routine may use the previous report in defining the value of the simulated output of the cell for re-running the simulation routine. This can simplify validation or verification of the apparent timing issue.

In an embodiment of the invention, a non-transitory computer-readable storage medium stores instructions that, when executed by a computer, cause the computer to perform the method 300. The computer-readable storage medium may store standard cells, with or without the configurations 202 for forcing the cell simulated output to the first or second value, and other elements for the IC design 200, as well as instructions for performing the method 300.

In more detail, FIG. 2 illustrates schematically behavioral models of modules in a gate-level design of an IC design 200 for simulation in an example of the method 300. The IC design 200 is illustrated as having blocks 1 to N having cells 1.1 to 1.m, up to cells N.1 to N.m respectively. The cells of the blocks 1 to N each have outputs connected to a sea of gates (SOG). The behavioral models of the cells also have configurations 202 for forcing the cell output to a first or second value, according to instructions from the simulation routine or from the operator. The cells of the blocks 1 to N may be standard cells from a standard cell library. It will be appreciated that the cells may be of various types such as flip-flops, clock-gates, latches and other types and the numbers and types of cells in different blocks 1 to N will typically be different. It is possible for behavioral models of the some of the cells to have the configurations 202 while others do not need the configurations 202. The cells whose behavioral models have the configurations 202 may also be standard cells available in the standard cell library as well as cells without the configurations 202.

The configurations 202 for forcing the cell output to a first or second value are illustrated in FIG. 2 in the form of hardware. It will be appreciated that, for the purpose of simulation of the IC design 200, the configurations 202 will typically be software representing equivalent functions, and which may be stored on non-transitory computer-readable storage medium. In the example shown in FIG. 2, each configuration 202 has an input from the output such as 204 of the respective basic cell 1.1 to 1.m, up to cells N.1 to N.m. The cell output 204 is connected to one input of a respective multiplexer 206, the other inputs of which receive a value 0, a value 1, and a random value (0/1). The multiplexer 206 has an output connected to the SOG, which assumes a value selected from its different inputs by a control signal on a control input 208. The control input 208 may be controlled by the instructions from the simulation routine or from the operator, for example.

Referring again to FIG. 3, for simplicity the configuration 202 is labeled in the drawing as Xfilter, it being understood that the configuration 202 of the behavioral model does not block the output 204 of the cell on a single value equal to its input but substitutes for the output of the basic cell, the random value 0/1 or the value 0 or 1 under the control of the instructions of the simulation routine or of the user. At step 306, the configuration 202 forces the output of the cell to a first value that may be a random value (0/1). Alternatively, the first value could be a predetermined value that is systematically 1 or 0.

In this example, the process step 316 comprises a decision at step 328 as to whether the first value to which the simulated output of the cell is forced at step 306 is high or low. If the first value is low at step 306, then at step 330 the simulated output of the cell is forced high. If the first value is high at step 306, then at step 332 the simulated output of the cell is forced low.

The process step 316 may be implemented using a software routine such as the following:

```
'ifdef NoXfilter
    always @ (notify_reg)
        notify = (notify_reg)
'else
    always (notify_reg) begin
    if ('Xfilter) notify = (notify_reg)
    case(1'b1)
        Xfilter_HIGH: force_value = 1'b1;
        Xfilter_LOW: force_value = 1'b0;
        Xfilter_RAND: force_value = $random;
        default: force_value = $random;
    endcase
    $display("%m force_value = %b". force_value;
    force q = force_value;
    force qb = ~force_value;
    @(negedge ckb);
    #2 release q ;
        release qb ;
    end
'endif
```

The invention may be implemented at least partially in a non-transitory machine-readable medium containing a computer program for running on a computer system. The program includes code portions for performing steps of a method according to the invention when run on the computer system.

Figure 4:
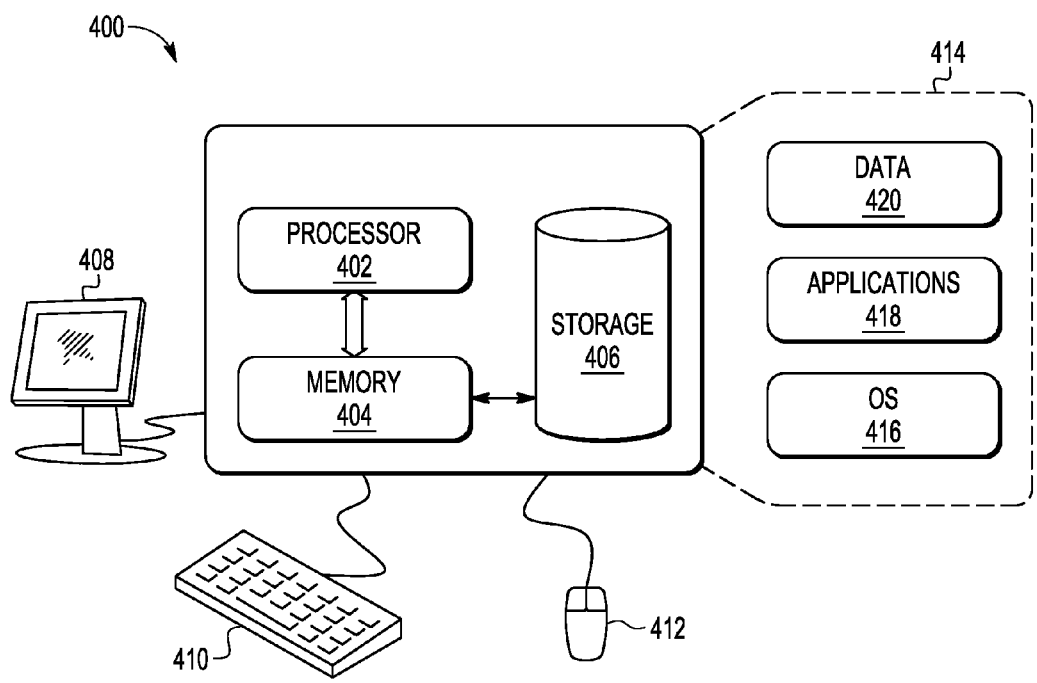
FIG. 4 is a schematic block diagram of an exemplary EDA tool for performing the methods of the present invention.

FIG. 4 is a schematic block diagram of an exemplary computer system 400 for performing the methods of the present invention described above. The computer system 400 includes a processor 402 coupled to a memory 404 and additional memory or storage 406 coupled to the memory 404. The computer system 400 also includes a display device 408, input devices 410 and 412, and software 414. The software 414 includes operating system software 416, applications programs 418, and data 420. The applications programs 418 can include, among other things, a gate-level simulator, and the data 420 can include a gate-level design, a modified or corrected gate-level design, and a cell library. The computer system 400 and the constituent parts are all well known in the art, and the novelty resides in the methods and steps described above regarding gate level simulation. When software or a program is executing on the processor 402, the processor becomes a "means-for" performing the steps or instructions of the software or application code running on the processor 402. That is, for different instructions and different data associated with the instructions, the internal circuitry of the processor 402 takes on different states due to different register values, etc., as is known in the art. Thus, any means-for structures described herein relate to the processor 402 as it performs the steps of the methods disclosed herein.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the above described operations are merely illustrative. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system for validating timing issues in a gate-level simulation of an integrated circuit design having a plurality of cells, the system comprising:
   a memory for storing the integrated circuit design and instructions; and
   a processor coupled to the memory, wherein the instructions are executed on the processor to run a simulation routine of a behavioral model of the integrated circuit design and obtain a first simulation result, and wherein the processor includes,
   if the first simulation result yields a possible timing violation at a cell corresponding to a forcing indeterminate value, means for forcing the simulated output of the cell to a first value, re-running the simulation routine, and obtaining a second simulation result;
   if the first simulation result does not yield a possible timing violation at the cell, means for generating a report indicating no apparent timing violation;
   if the second simulation result yields an apparent timing violation at the cell, means for generating a report of the apparent timing violation at the cell;
   if the second simulation result does not yield an apparent timing violation at the cell, means for generating a report of the first value and status of the simulated output of the cell, forcing the simulated output of the cell to a second value, re-running the simulation routine, and obtaining a third simulation result;
   if the third simulation result yields an apparent timing violation at the cell, means for generating a report of the apparent timing violation at the cell; and
   if the third simulation result does not yield an apparent timing violation at the cell, means for completing the simulation.

2. The system of claim 1, wherein the first value is a random value.

3. A method of validating timing issues in a gate-level simulation of an integrated circuit design having a plurality of cells, wherein the integrated circuit design is stored in a memory and a processor is coupled to the memory, the method comprising:
   running a simulation routine of a behavioral model of the design and obtaining a first simulation result, wherein the behavioral model is stored in the memory and the simulation is run on the processor;

if the first simulation result yields a possible timing violation at a cell corresponding to a forcing indeterminate value, forcing the simulated output of the cell to a first value, re-running the simulation routine on the processor and obtaining a second simulation result;

if the first simulation result does not yield a possible timing violation at the cell, then generating a report indicating no apparent timing violation;

if the second simulation result yields an apparent timing violation at the cell, generating a report of the apparent timing violation at the cell;

if the second simulation result does not yield an apparent timing violation at the cell, generating a report of the first value and status of the simulated output of the cell, forcing the simulated output of the cell to a second value, re-running the simulation routine on the processor and obtaining a third simulation result;

if the third simulation result yields an apparent timing violation at the cell, generating a report of the apparent timing violation at the cell; and if the third simulation result does not yield an apparent timing violation at the cell, completing the simulation by the processor.

4. The method of claim 3, wherein a gate-level design of the integrated circuit design is compiled using standard cells selected from a library, at least some of whose behavioral models include configurations for forcing the cell simulated output to the first or second value.

5. The method of claim 4, wherein the configurations for forcing the cell simulated output substitute the first value or the second value of the cell simulated output for a value of the cell output which would otherwise be obtained.

6. The method of claim 3, wherein the first value is a random value.

7. The method of claim 3, wherein:

if the first simulation result yields a possible timing violation at a plurality of cells, the simulated outputs of the plurality of cells are forced to respective first values, the simulation routine is then re-run and a second simulation result obtained;

if the second simulation result yields an apparent timing violation at one or more of the plurality of cells, a report is generated of the presence or absence of apparent timing violations, the first values and statuses of the simulated outputs at the plurality of cells;

at least for the cell or cells whose result was no apparent timing violation, the simulated outputs of the cell or cells are forced to second values, different from the respective first values, the simulation routine is re-run and a third simulation result is obtained; and if no apparent timing violations appear with the second values either, the simulation is re-run again, with iterations of the simulation routines and reports until the source of the timing violation of the first simulation result is identified.

8. The method of claim 3, wherein completing the simulation includes checking whether a simulation process is complete and, if not, running further simulation routines.

9. The method of claim 3, wherein at least some of the cells are connected sequentially.

10. The method of claim 3, wherein a report of the simulation result, of the simulated output value of the cell and of whether the simulated output value of the cell was forced is generated for each of the simulation routines performed.

11. The method of claim 10, wherein re-running the simulation routine uses the previous report in defining the value of the simulated output of the cell for re-running the simulation routine.

\* \* \* \* \*